United States Patent
Westort et al.

(10) Patent No.: US 6,935,747 B2
(45) Date of Patent: Aug. 30, 2005

(54) IMAGE ENHANCEMENT AND ABERRATION CORRECTIONS IN A SMALL REAL IMAGE PROJECTION SYSTEM

(75) Inventors: Kenneth S. Westort, Ithaca, NY (US); Douglas L. Robinson, Ithaca, NY (US)

(73) Assignee: Optical Products Development, Elmira, NY (US)

( * ) Notice: Subject to any disclaimer, the term of this patent is extended or adjusted under 35 U.S.C. 154(b) by 0 days.

(21) Appl. No.: 10/388,062

(22) Filed: Mar. 13, 2003

(65) Prior Publication Data

US 2003/0210380 A1 Nov. 13, 2003

Related U.S. Application Data

(63) Continuation-in-part of application No. 10/350,762, filed on Jan. 24, 2003, and a continuation-in-part of application No. 09/946,183, filed on Sep. 5, 2001, now Pat. No. 6,598,976, which is a continuation-in-part of application No. 09/557,859, filed on Apr. 26, 2000, now abandoned.
(60) Provisional application No. 60/131,320, filed on Apr. 27, 1999.

(51) Int. Cl.[7] .................. G03B 21/26; G03B 21/00; G03B 21/28; G02B 27/22; G02B 27/14
(52) U.S. Cl. .................. 353/28; 353/78; 353/10; 359/479; 359/631
(58) Field of Search .................. 353/7, 98, 28, 353/30, 37, 77, 10, 99, 74, 78; 359/629, 462, 478, 479, 630, 631, 477, 13, 483, 850, 857, 858, 864, 633; 349/67, 11; 463/30–34

(56) References Cited

U.S. PATENT DOCUMENTS

| | | | |
|---|---|---|---|
| 2,576,147 A | * 11/1951 | Sauvage | 40/427 |
| 3,647,284 A | 3/1972 | Elings et al. | 350/294 |
| RE27,356 E | 5/1972 | LaRussa | 350/157 |
| 3,682,532 A | 8/1972 | Myles | 350/157 |
| 4,093,347 A | 6/1978 | LaRussa | 350/174 |
| 4,112,462 A | * 9/1978 | Mecklenborg | 348/121 |
| 4,653,875 A | 3/1987 | Hines | 350/442 |
| 4,721,380 A | 1/1988 | Gryglas | 353/66 |
| 4,802,750 A | 2/1989 | Welck | 350/619 |

(Continued)

FOREIGN PATENT DOCUMENTS

| | | | |
|---|---|---|---|
| JP | 07 043634 | 2/1995 | G02B/27/02 |
| JP | 08 152579 | 6/1996 | B02B/27/28 |
| WO | WO 00/65844 | 11/2000 | H04N/9/30 |

OTHER PUBLICATIONS

Jenkins, Francis A and White, Harvey E. "Fundamentals of Optics". McGraw–Hill Publishing Company Ltd. 1937.
U.S. Appl. No. 10/126,167, filed Apr. 19, 2002, Robinson et al.
U.S. Appl. No. 10/147,632, filed May 16, 2002, Turner et al.

*Primary Examiner*—Judy Nguyen
*Assistant Examiner*—Andrew Sever
(74) *Attorney, Agent, or Firm*—Aquilla & Associates

(57) ABSTRACT

An improved real image projection system comprises, in the primary configuration, a tilted mirror to eliminate ghost reflections, and a unique arrangement allowing the introduction of a second background image without a 50%/50% beamsplitter, while providing system transmission of approximately 50%. A secondary configuration incorporates an elliptical or aspheric curved mirror designed to simulate the surface of a spherical curve when light strikes the elliptical surface at an angle equal to the elliptical angle of the curved mirror. In a third configuration, a single curved mirror has two different optical surfaces of revolution, one on the convex surface and one on the concave surface. The concave surface is much like that of a Mangin lens, but it has an aspheric surface of revolution, optimized to reduce spherical aberrations over a larger area offset from the optical axis.

24 Claims, 14 Drawing Sheets

U.S. PATENT DOCUMENTS

| | | | | |
|---|---|---|---|---|
| 4,810,092 A | | 3/1989 | Auth | 356/346 |
| 4,850,152 A | | 7/1989 | Heynacher et al. | 51/165 |
| 4,989,953 A | | 2/1991 | Kirschner | 359/888 |
| 5,237,157 A | | 8/1993 | Kaplan | 235/375 |
| 5,257,130 A | | 10/1993 | Monroe | 359/478 |
| 5,268,775 A | | 12/1993 | Zeidler | 359/40 |
| 5,291,897 A | | 3/1994 | Gastrin et al. | 128/716 |
| 5,305,124 A | | 4/1994 | Chern et al. | 359/13 |
| 5,311,357 A | | 5/1994 | Summer et al. | 359/479 |
| 5,369,450 A | * | 11/1994 | Haseltine et al. | 348/745 |
| 5,380,999 A | * | 1/1995 | Prakash et al. | 250/216 |
| 5,486,840 A | | 1/1996 | Borrego et al. | 345/7 |
| 5,539,578 A | * | 7/1996 | Togino et al. | 359/630 |
| 5,576,887 A | | 11/1996 | Ferrin et al. | 359/631 |
| 5,585,946 A | * | 12/1996 | Chern | 349/5 |
| 5,596,451 A | | 1/1997 | Handschy et al. | 359/633 |
| 5,606,458 A | | 2/1997 | Fergason | 359/630 |
| 5,621,572 A | | 4/1997 | Fergason | 359/630 |
| 5,687,025 A | | 11/1997 | Nanba | 359/633 |
| 5,708,529 A | * | 1/1998 | Togino et al. | 359/630 |
| 5,777,794 A | | 7/1998 | Nakaoka | 359/632 |
| 5,777,795 A | | 7/1998 | Colucci | 359/633 |
| 5,782,547 A | | 7/1998 | Machtig et al. | 353/28 |
| 5,831,712 A | | 11/1998 | Tabata et al. | 351/158 |
| 5,886,818 A | | 3/1999 | Summer et al. | 359/478 |
| 5,903,396 A | * | 5/1999 | Rallison | 359/630 |
| 5,944,403 A | * | 8/1999 | Krause | 353/74 |
| 5,961,192 A | | 10/1999 | Bernart et al. | 312/223.3 |
| 6,163,408 A | | 12/2000 | LaRussa | 359/630 |
| 6,262,841 B1 | * | 7/2001 | Dike | 359/483 |
| 6,262,849 B1 | * | 7/2001 | Potin et al. | 359/631 |
| 6,315,416 B1 | | 11/2001 | Dominguez-Montes et al. | 353/99 |
| 6,318,868 B1 | | 11/2001 | LaRussa | 359/857 |
| RE37,667 E | * | 4/2002 | Togino et al. | 359/630 |
| 6,364,490 B1 | | 4/2002 | Krause | 353/77 |
| 6,390,626 B2 | | 5/2002 | Knox | 353/20 |
| 6,421,182 B1 | * | 7/2002 | Holden | 359/629 |
| 6,445,407 B1 | | 9/2002 | Wright | 348/51 |
| 6,497,484 B1 | | 12/2002 | Hoerner et al. | 353/10 |
| 6,522,483 B2 | | 2/2003 | Kreuzer | 359/727 |
| 6,598,976 B2 | | 7/2003 | Westort et al. | 353/28 |
| 6,607,275 B1 | | 8/2003 | Cimini et al. | 353/28 |
| 6,612,701 B2 | | 9/2003 | Westort et al. | 353/10 |
| 6,623,120 B2 | * | 9/2003 | Neff et al. | 353/7 |
| 6,650,470 B1 | | 11/2003 | Turner et al. | 359/443 |
| 2002/0027718 A1 | | 3/2002 | Kruezer | 359/631 |
| 2002/0184104 A1 | | 12/2002 | Littman | 705/26 |
| 2003/0035086 A1 | | 2/2003 | Robinson et al. | 353/10 |
| 2003/0147145 A1 | | 8/2003 | Robinson et al. | 359/649 |
| 2003/0197839 A1 | | 10/2003 | Robinson et al. | 353/98 |

\* cited by examiner

TARGET OBJECT

REAL IMAGE
(FIELD CURVATURE DISTORTION)

TARGET OBJECT
CRT WITH PIN-CUSHION

REAL IMAGE WITH
FIELD CURVATURE
DISTORTION

IMAGE ENHANCEMENT AND ABERRATION CORRECTIONS IN A SMALL REAL IMAGE PROJECTION SYSTEM

REFERENCE TO RELATED APPLICATIONS

This is a continuation-in-part patent application of application Ser. No. 09/946,183, filed Sep. 5, 2001 now U.S. Pat. No. 6,598,976, entitled "METHOD AND APPARATUS FOR IMAGE ENHANCEMENT AND ABERRATION CORRECTIONS IN A SMALL REAL IMAGE PROJECTION SYSTEM, USING AN OFF-AXIS REFLECTOR, NEUTRAL DENSITY WINDOW, AND AN ASPHERIC CORRECTED SURFACE OF REVOLUTION," and application Ser. No. 10/350,762, filed Jan. 24, 2003, entitled "REAL IMAGING SYSTEM WITH REDUCED GHOST IMAGING," which is a continuation-in-part patent application of application Ser. No. 09/557,859, filed Apr. 26, 2000, entitled "REAL OR VIRTUAL IMAGING SYSTEM WITH REDUCED GHOST IMAGING," now abandoned, which claims an invention that was disclosed in Provisional Application No. 60/131,320, filed Apr. 27, 1999, entitled "NO GHOST FILTER." The benefit under 35 USC §119(e) of the United States provisional application is hereby claimed, and the four aforementioned applications are hereby incorporated herein by reference in their entirety.

BACKGROUND OF THE INVENTION

1. Field of the Invention

The invention pertains to the field of small optical display systems. More particularly, the invention pertains to apparatus and methods for enhancement of a real image projection system through the use of several combinations of methods of aberration reduction and system brightness enhancement. The primary enhancement is reduced ghosting and reduction of astigmatism, common with small real image systems wherein the viewing distance is relatively close.

2. Description of Related Art

The present invention pertains to a real image projection system, and in particular, to a system in which an image of a real object is formed in space, giving the illusion that a real object exists at that point in space, when in reality it does not. Real image projection systems normally incorporate spherical or parabolic mirrors for imaging. In large systems, where the viewer is located at a significant distance from the image being viewed, optical aberrations, such as, for example, spherical aberrations, and astigmatism in particular, are not as much of a problem as in smaller systems, where the viewer is located close to the image. Astigmatism causes eye strain when viewing the image for long periods of time, and this has been one of the primary reasons that small real image projection systems have not been widely incorporated in gaming applications, as well as in workstation applications.

Another reason for the lack of wide-spread acceptance of small real imaging systems is that ghost images in the systems are much more noticeable, when viewing the display from a close distance. Many approaches have been used to reduce ghosting, including tinted beamsplitters and polarizers, none of which are extremely effective. Even with the use of a circular polarizing window, the ghost images are visible because of elliptical polarizing effects of the 45 degree beamsplitter, although they can be significantly reduced. The circular polarizing windows typically have a maximum transmission of 42%, and this significantly reduces image brightness. Thus, in an arcade or other public area that is brightly lit, the real image usually is difficult to see.

Other optical aberrations present problems for real image projection systems. For example, field curvature distortion is a significant problem for smaller systems, because of the shorter focal lengths typically associated with small systems. For example, a rectangular shape displayed on a CRT screen projects as a "fish-eyed" real image of the target object. The sides of the rectangular image appear to bow outward and the center of the rectangular image appears magnified, as compared to the edges. This is a natural phenomenon of spherical mirrors, and cannot normally be corrected without a significant number of additional lenses in the beam-path, which makes the display system significantly larger in physical size, as well as making the cost of manufacturing such displays prohibitive.

Tilting of the curved mirror has been attempted in other prior art real imaging systems, but this has primarily been accomplished with a beamsplitter to divert the converging imaging beampath at a 90 degree angle, in relation to the diverging target beampath. This method has not been widely accepted because of the additional focal length distance required to form the image at the viewing position, which significantly reduces the field of view. For example, in a non-tilted system having a 48" radius mirror, tilting of the curved optic at a 15 degree angle to eliminate ghosting and form the image at the same point in space would require a 54" radius mirror, thus reducing the field of view by a substantial amount. In textbooks, a spherical mirror is used to display a real image of a flower vase in a system similar to the tilted mirror system of the present invention, however, the described prior art system would not allow the use of a beamsplitter for providing a secondary virtual background image. The present invention utilizes a unique configuration that overcomes this problem of the prior art, with minimal loss of system brightness transmission, and without reducing fields of view.

The biggest problem with a tilted system utilizing a beamsplitter is that system transmission is only approximately 15%. This is a result of the imaging beam both transmitting then reflecting from the beamsplitter, which reduces transmission by 50%.

Tilting of the optic also causes serious aberrations to the image, because the beampath strikes the tilted (i.e., 15 degree tilt) curved mirror at 15 degrees to the mirror axis. The beampath strikes the spherical mirror at 15 degrees, which is actually an elliptical curve at the plane of intersection. The spherical surface of revolution becomes more elliptical as the angle approaches the outer top edge of the spherical mirror.

Optics have been designed to compensate for some of these aberrations, such as, for example, spherical aberrations, through use of the Mangin mirror. This is a mirror that has a reflective convex spherical surface of longer spherical radius, and a transmissive concave spherical surface of shorter radius. However, this approach is not practical for a real image projection system, because the image source or target is not a point at the focal point or center of curvature of the mirror, as in a single point imaging system. In a real image projection system, the target usually is a rectangle, such as a monitor screen, where only the center of the screen is on the axis or at the focal point of the mirror. The Mangin dual curve corrective mirror could be significantly improved by replacing the concave spherical surface with an aspheric surface of revolution, which will reduce the astigmatism for points offset from the axis of the mirror. Thus, a Mangin mirror incorporating two spherical curves is extremely effective for points along the axis of an on-axis system, but the problem of astigmatism becomes progressively worse as the target point deviates from the axis of the mirror curvature. An aspheric curve on the concave surface would optimize the correction and reduce the astigmatism for a larger area around the axis or focal point.

One other reason that small systems have not become mainstream is because of the difficulty in producing the curved optics in reasonable volume. The problem is compounded when corrective optical curvatures are incorporated.

SUMMARY OF THE INVENTION

Briefly stated, an improved real image projection system comprises, in the primary configuration, a tilted mirror to eliminate ghost reflections, and a unique arrangement allowing the introduction of a second background image without a 50%/50% beamsplitter, while providing system transmission of approximately 50%. A secondary configuration incorporates an elliptical or aspheric curved mirror designed to simulate the surface of a spherical curve when light strikes the elliptical surface at an angle equal to the elliptical angle of the curved mirror. In a third configuration, a single curved mirror has two different optical surfaces of revolution, one on the convex surface and one on the concave surface. The concave surface is much like that of a Mangin lens, but it has an aspheric surface of revolution, optimized to reduce spherical aberrations over a larger area offset from the optical axis.

DETAILED DESCRIPTION OF THE INVENTION

Figure 1:
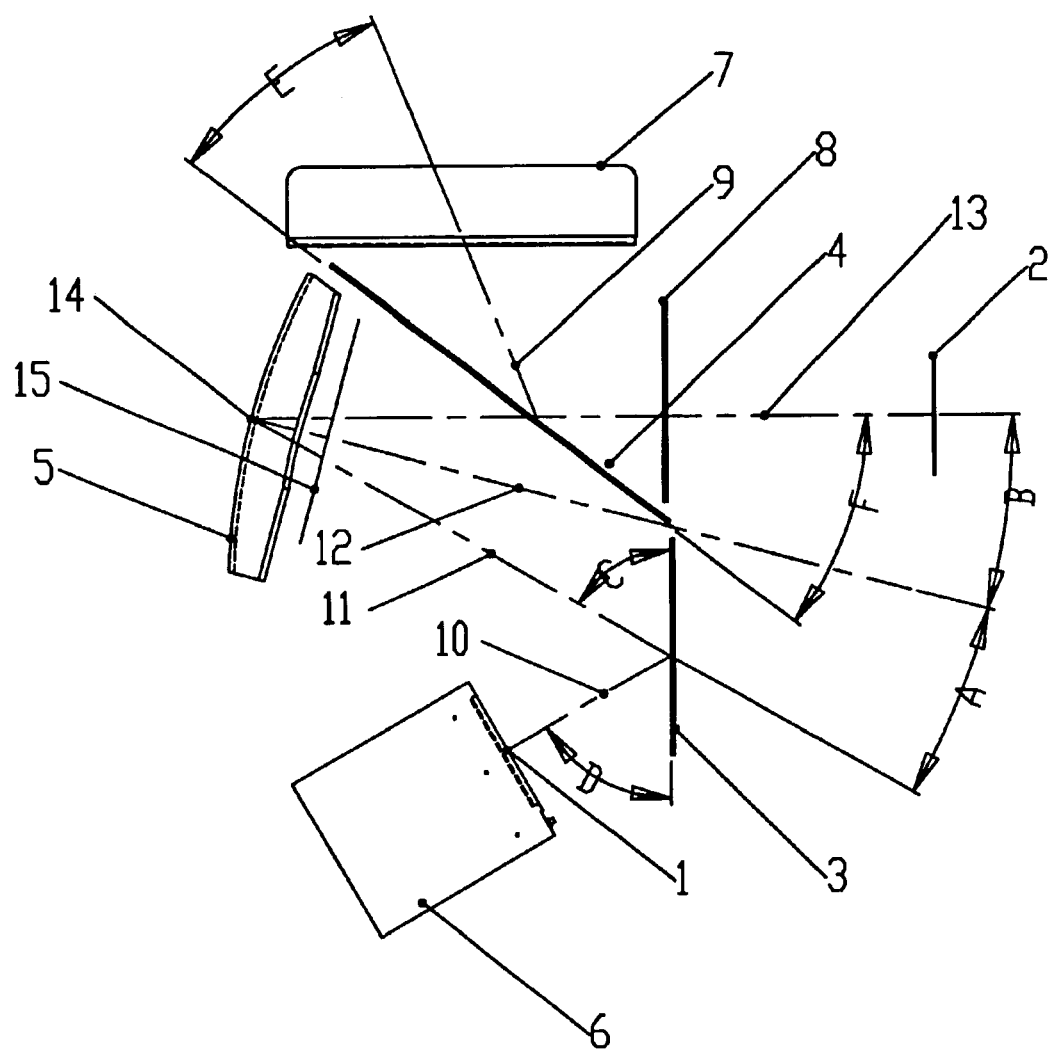
FIG. 1 shows the optical configuration of configuration #1 with a tilted curved mirror and clear substrate for forming a virtual background image.

The real image projection system of the present invention uses several combined methods of producing small displays having improved imagery and reduced ghosting over prior art systems.

There are two problems in manufacturing mirrors with minimal aberrations and astigmatism. The quality of the surface of revolution must be very precise. This typically involves precision polishing of the surfaces, thus limiting the volume of such mirrors that can be produced in a given time, and creating a cost that is outside of what generally is acceptable for a commercial real image display system. Also, aspheres and ellipses are extremely difficult to produce and must be hand polished to precise curves. Thus, the complexity of the elliptical and aspheric optical surfaces of revolution prevents the mirror from being produced in large volume, therefore the preferred methods of manufacture are injection molding and vacuum forming.

In all the configurations of the present invention, field curvature aberration is a significant problem. Field curvature distortion cannot be removed optically without incorporating several corrective lenses in the optical path. Field curvature distortion causes a target object to be projected with the appearance of a "fish-eye" lens. The center of the image appears magnified and the edges tend to bow outward. The present invention uses a unique approach to correcting for this distortion. The target image on the face of the CRT is "Pin-Cushioned" or compensated for the fish-eye distortion. This is accomplished electronically in a CRT, or by software in the case of a LCD panel input.

The primary problem with small real imaging systems is the production of unwanted ghost images, which are typical of on-axis projection systems. When a viewer looks into the aperture of a real image projection system, the viewer sees a reflection of himself upside-down, floating inside the display unit. Any source of light or reflection outside the system, which enters the window view-aperture, forms an image inside the system, which is visible to the observer. The device of the present invention uses a combination of methods to eliminate ghosting. The curved mirror is tilted off-axis to the input beam-path, preferably at an angle between 12 and 18 degrees. The optimum tilt is 15 degrees, since this totally eliminates ghosting, while keeping field curvature distortion at a minimum that can be corrected using the "pin-cushioned" input source and an elliptical surface of revolution as the primary curved mirror.

The preferred configuration of the present invention is a single mirror system tilted at between 12 and 18 degrees off of the viewing axis. The design is similar to the prior art system depicted in White and Jenkins' textbook, except it uses a clear glass substrate as a beamsplitter to project a virtual background image behind the real image, while the prior art system of Jenkins and White would not allow the use of a beamsplitter configured as depicted herein. All prior art systems using a beamsplitter require that the beamsplitter intersect both the target beampath and the imaging beampath, in order to redirect the image through the viewing aperture. The resulting effect was that system transmission was reduced by approximately 50%. The preferred configuration of the present invention overcomes these problems and limitations, through a unique arrangement of optical elements that both reduces ghosting and maximizes system transmission, without sacrificing field of view.

The preferred embodiment comprises a target object or monitor with the beampath emanating forward toward the front of the projection system at a 30 degree upward angle. At the front of the system is a fold mirror or flat mirror positioned vertically with the reflective surface facing the rear of the system, and where the projected beampath strikes the center of the fold mirror at a 30 degree angle to the surface. The diverging beampath is then reflected at a complimentary (e.g., 15 degrees in this example) angle upwards toward the rear of the projection system, where it strikes a curved mirror, located directly over the target source, with the curved reflective surface facing the front of the system. The curved mirror is tilted with the top of the mirror forward, preferably at a 15 degree angle, and positioned so that the axis of the reflected beampath from the fold mirror strikes the center of the curved mirror. The converging beampath then is projected toward the viewing aperture on a horizontal viewing plane. The system uses a clear glass substrate (preferably with one side coated with an anti-reflective coating) as a beamsplitter to allow the background image to be incorporated. The glass substrate is positioned so that the top of the glass is located near the top of the curved tilted mirror and the bottom of the glass plate is positioned just under the viewing aperture and just above the fold mirror. Since the glass substrate does not intersect the target beampath, the beamsplitter does not require a high reflectivity and the 4% normal reflectivity of clear glass is sufficient to produce an acceptable background image. Thus, the system transmission of the imaging beampath from the curved mirror is reduced by only 4%, as compared to 50% for a typical beamsplitter system of the prior art. The resulting system transmission is 96%×86%×96% (i.e., approximately 78%) as it passes through the clear glass substrate. The lightbeam then passes through a window and forms the image in viewer space. The window optionally is constructed using either a neutral density filter material or a circular polarizer material, as described in Applicant's prior patent application Ser. No. 09/557,859, filed Apr. 27, 2000, now abandoned, and application Ser. No. 10/350,762, filed Jan. 24, 2003, the complete disclosures of which are hereby incorporated herein by reference. The preferred embodiment uses 15 degree tilt as an example, but the invention is not limited to that angle. This embodiment requires one curved mirror, of either elliptical, parabolic, aspheric or spherical surface of revolution.

In a second embodiment, the system of the present invention comprises a curved mirror with an aspheric surface of revolution approximating and elliptical curve, or an elliptical surface of revolution equal to the tilted angle of the curved mirror, a target object or real object, a beamsplitter positioned in the beam-path between the target object, and a curved elliptical mirror, with the mirror being positioned off-axis to the normal beam-path axis. In this configuration, the imaging beampath both reflects off of and transmits through the beamsplitter. For purposes of explanation, the curved elliptical mirror is tilted at 15 degrees. When referring to a 15 degree ellipse, this is the effective curve, when a circle is viewed at 15 degrees offset from normal angle of incidence. The beamsplitter is positioned substantially at, but not limited to, a 45-degree angle relative to the optical axis of the curved mirror. Light from the target object is directed in diverging rays, reflecting off a fold mirror, transmitting through the beamsplitter to the curved elliptical mirror. The primary beam-path axis, from the beamsplitter to the curved mirror, is at a 15 degree angle non-coincident with the optical axis of the curved mirror. The beampath strikes the elliptical curved mirror at a 15 degree angle and, because the ellipse is of a surface of revolution equal to a circle tilted at 15 degrees, the plane of the beampath sees the tilted elliptical surface as a spherical curve. The light is reflected from the curved mirror in a convergent beam at a complementary angle to the primary beam-path angle, relative to the optical axis of the curved mirror. The converging beam-path then reflects off the beamsplitter and intersects, or comes to focus, at a point on the view axis, and forms a real image in space in front of the optical structure. Light entering the window aperture of the system is directed down and blocked from exiting through the viewing aperture, therefore, no ghost image is visible to the viewer. The image has minimal elliptical distortion, because the off-axis ellipse causes the beampath to be reflected to a near common focal point much the same as that of an on-axis sphere.

In a typical 15 degree off-axis tilted spherical system, the lower edge of the mirror is viewed as a true sphere at the beampath plane, while the center of the mirror is viewed as a 15 degree ellipse, and the top edge of the mirror is viewed as a 30 degree ellipse. In a visual system, an elliptical surface of revolution of over 20 degrees causes significant image distortion and eyestrain, making the system impractical for visual displays. In the tilted 15 degree elliptical configuration of the present invention, the lower edge of the mirror is viewed by the beampath as a 15 degree ellipse, the center of the mirror is viewed by the beampath plane as a true sphere, and the upper edge of the tilted elliptical mirror is viewed by the beampath as a 15 degree ellipse. This reduces the maximum elliptical angle of the system by 15 degrees, from 30 degrees to 15 degrees, and therefore significantly reduces aberrations and eyestrain. The elliptical effect can be further improved by use of an aspheric surface of revolution, further reducing the aberrations of the system.

Tilting of the curved mirror also eliminates secondary ghosting or formation of an image from a light source outside the system, by reflecting the ghost image to an area below the window aperture and not allowing it to be seen by the viewer. The surface below the window aperture, inside of the system, preferably is a flat black surface. This surface is imaged at the window aperture, creating a very dark window opening, and providing extremely high contrast, when viewing the real image.

In a small real image display system, there is more chance for the viewer to move outside of the recommended view area or the "eye-box". As one looks at the system from below, at an angle looking upwards, there will be some ghosting visible. Such ghosting is reduced by using a neutral density window. A neutral density material is one that transmits or reflects an equal amount of light for all wavelengths across the visible light spectrum. The optimum neutral density absorption is approximately 30%, although other absorption rates work as well, depending upon how the system is used and the required image brightness. Imaging light from the target is reduced by, for example, 30%, while light from a source outside the system passes through the neutral density window, reducing intensity by 30%, and is reflected by the curved mirror and reduced by an additional 30% as it exits through the neutral density window, thus forming a ghost image of greatly reduced intensity. Alternatively, another optional embodiment includes the use of a neutral density beam-splitter, which performs the same function as the neutral density window.

A third embodiment of the present invention uses a single curved mirror, tilted at an angle of between 12 and 18 degrees, having two different optical surfaces of revolution, one on the convex surface and one on the concave surface. In one embodiment, the convex surface is a conical curve of spherical, elliptical or parabolic surface of revolution, optionally coated with a reflective optical coating. The concave surface is much like that of a Mangin mirror, but it has an aspheric surface of revolution, optimized to reduce spherical aberrations over a larger area offset from the optical axis. The system optionally employs a single aspheric surface of revolution on the concave surface for reduction of aberrations, although the Mangin mirror approach, using an aspheric concave surface of revolution, is the preferred embodiment of this configuration.

Thus, the three main imaging system configurations disclosed herein are summarized as follows:

(1) the preferred configuration includes a curved mirror of either spherical, elliptical, parabolic, or aspheric surface of revolution, tilted at an angle of between 12 and 18 degrees, in which the target beampath from the target source to the curved mirror does not intersect a beamsplitter, and wherein the imaging beampath from the curved mirror to the real image position transmits through a clear substrate, thus forming a virtual image of a background image reflected off the uncoated glass surface;

(2) an alternative configuration includes a curved mirror with an elliptical surface of revolution, with the elliptical angle equal to the tilt of the curved mirror. This configuration utilizes a beamsplitter that both transmits and reflects the optical beampaths, resulting in improved imagery and reduced aberrations, and both with nearly total elimination of secondary ghosting;

(3) a third configuration includes a combination of a precision, dual-curve, aspheric mirror (made possible through diamond-turning and injection molding), a tilted off-axis configuration, and a neutral density window, and provides a superior small real image projection system having a brighter image, significant ghost reduction, and significantly reduced optical aberrations and distortions, which otherwise are common to small displays. When an optional pin-cushioned CRT input is incorporated, the system performance is improved even more. The incorporation of any or all of the present improvements significantly improves the performance of small real image projection systems.

FIG. 1 shows the preferred configuration of the present invention. The curved mirror (5) is tilted at an angle of between 12 and 18 degrees, and for description purposes, the angle of 15 degrees is selected. The components are positioned with the monitor (6) facing forward and tilted upward at a 30 degree angle from horizontal. A flat reflective fold mirror (3) is positioned vertically directly below the window aperture (8) at a position where the center of the fold mirror (3) is coincident with the beampath axis (10) from the monitor (6). The tilted curved mirror is positioned above and behind the input monitor (6) at a position where the center or vertex (14) of the curved mirror is coincident with the reflected beampath axis (11) as reflected off of the fold mirror (3). A clear glass substrate (4) is positioned in front of the curved mirror (5) at an angle (F) from horizontal, where a background monitor (7) image beampath (9) is reflected off of the front surface of the beamsplitter (4), reflecting at a complimentary angle (F) along the viewing axis (13) and forming a virtual image (15) in front of the curved mirror (5).

Light (10) emitted from the monitor (6) strikes the fold mirror (3) at an angle of 60 degrees (D) and is reflected (11) at a complimentary angle (C), striking the Curved Mirror (5) with the primary axis of the beampath (11) striking the vertex (14) or center of the curved mirror (5). The uniqueness of the design is that the input or target beampath (10,11) does not transmit through or reflect from the beamsplitter (4), and therefore the transmission is not reduced by the normal 50% as in a conventional system. The imaging beampath (13) reflects off of the curved mirror (5) at a complimentary angle (B) to the target beampath (110) angle (B), as related to the curved mirror axis (12). The beampath (13) then transmits through the clear glass substrate (4) with a loss of approximately 4% in transmission, then passes through the system window (8), forming a real image (2) in viewer space. The background monitor (7) is positioned so that the center of the monitor (7) is at a complimentary angle (E) to the horizontal viewing axis (13) as relative to the angle (F) of the clear glass surface (4). The background monitor emits light (9), which strikes the surface of the clear glass substrate (4) and reflects along the viewing axis (13). A virtual image (15) of the background monitor (7) is visible behind the clear glass substrate (4). This allows a background image (15) to be incorporated without the normal double pass, when using a conventional beamsplitter.

Figure 2:
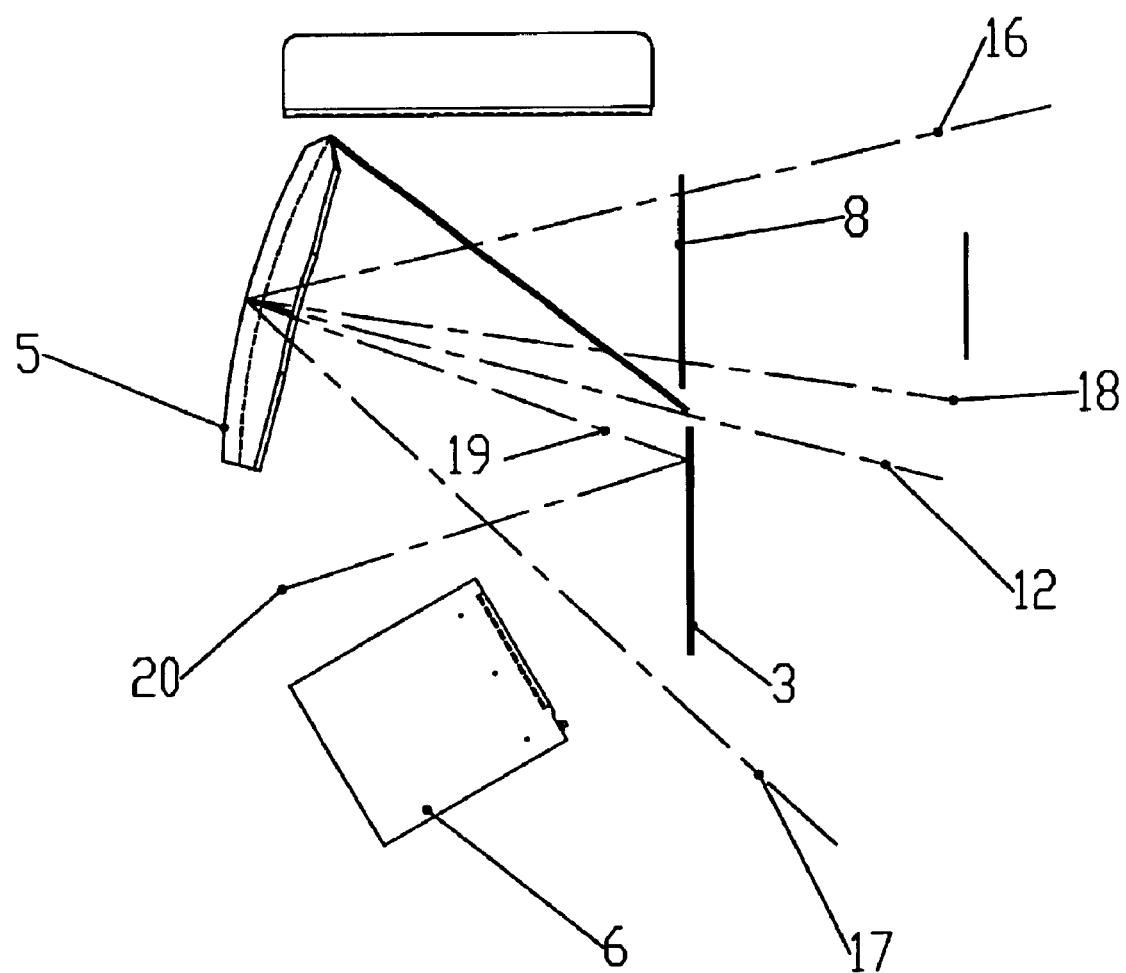
FIG. 2 shows the ghost imaging of the system of configuration #1

FIG. 2 shows the ghost image reduction of the system depicted in FIG. 1. Light (16) from an outside source enters the system through the window aperture (8) striking the curved mirror (5), and reflecting off at a complimentary angle (17) relative to the curved mirror (5) axis (12). The reflected light (17) is unable to exit through the window (8) and is therefore not visible by the viewer. Light entering from a lower angle (18) reflects off of the curved reflector (5) and then is directed (19) toward the fold mirror (3), which in turn reflects the light (20) toward the rear of the system and again is not allowed to exit through the window (8) and is not visible to the viewer.

Figure 3:
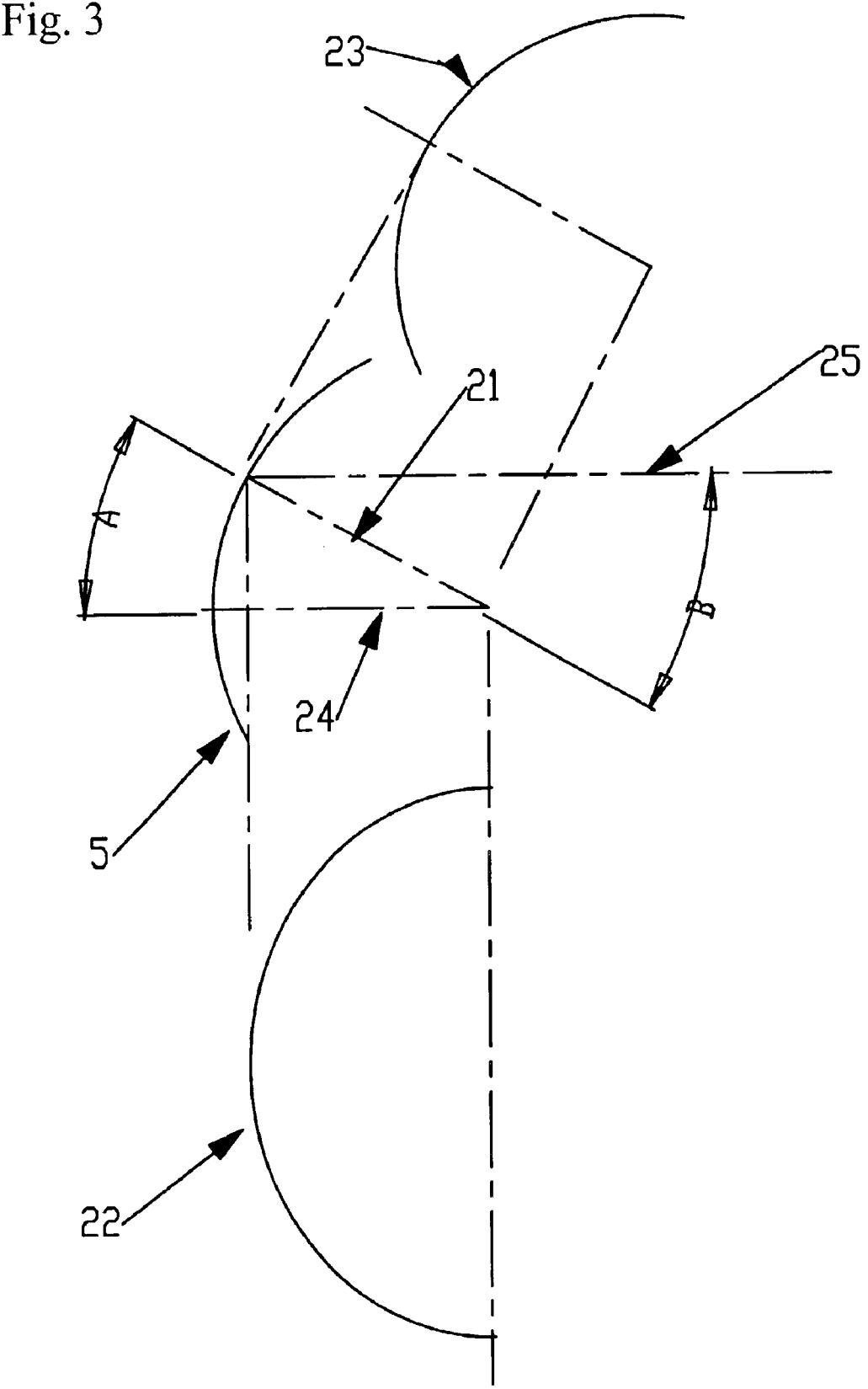
FIG. 3 shows the simulated spherical curve of an elliptical mirror tilted at a 15 degree off-axis position.

FIG. 3 shows how the elliptical curve of configuration #2 can improve imagery when used in a tilted system. The elliptical curved mirror (5) is tilted in the example at 30 degrees. The elliptical surface of revolution (22) is the equivalent to a circle (23) viewed at a 30 degrees angle (B). As light (25) strikes the elliptical curved mirror (5) at a 30 degree angle (B) relative to an axis (21) from the optical center of the ellipse, the actual curve (23) at the point the light (25) strikes the curved mirror (5) is a sphere, and images as a sphere, thus compensating for the elliptical error that causes distortions in a tilted mirror system.

Figure 4:
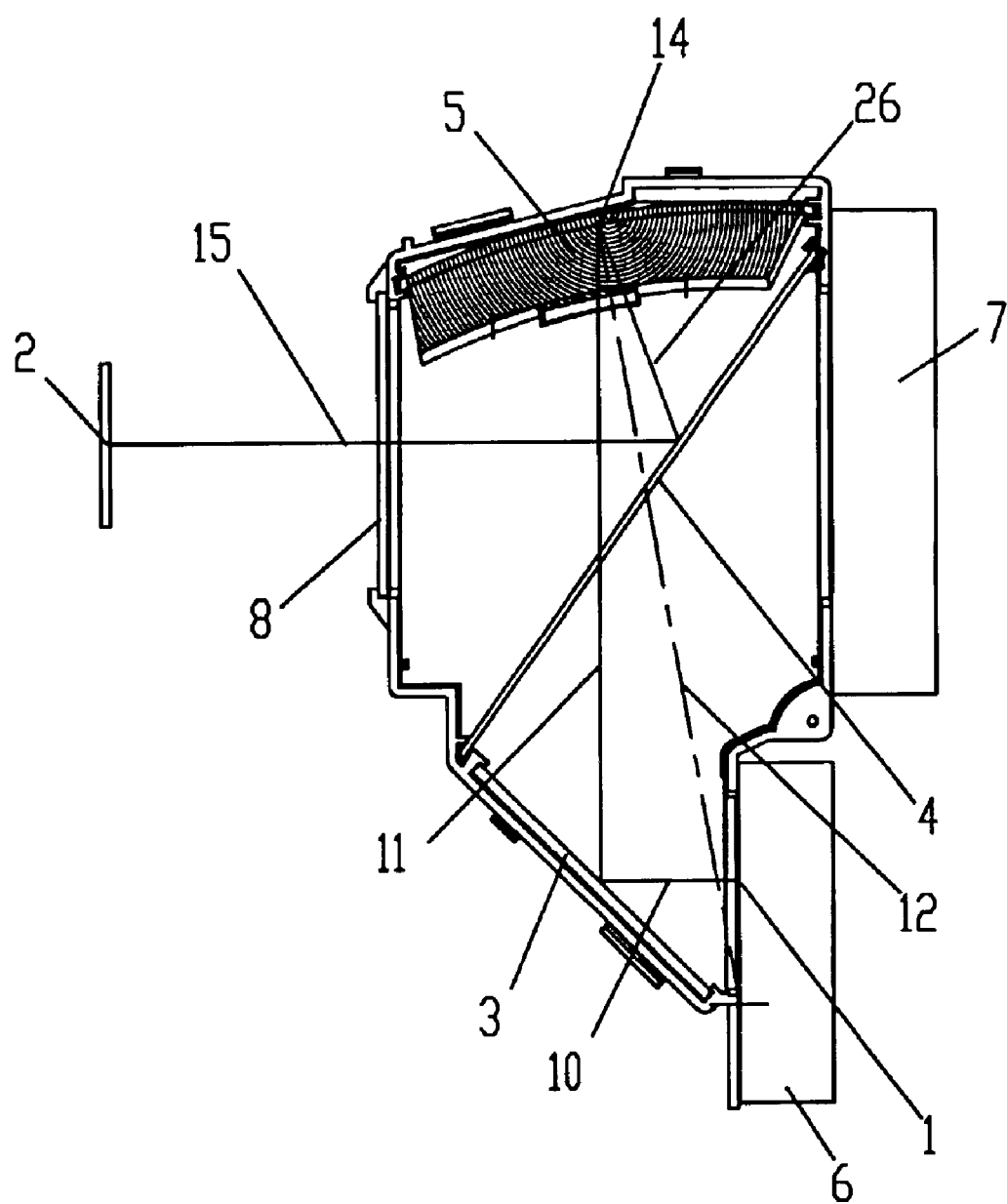
FIG. 4 shows the optical layout and the orientation of optical components of the real image projection system of configuration #2 of the present invention.

FIG. 4 shows an embodiment of the optical system for configuration #2 of the present invention. The image source is a LCD or monitor (6) which emits light (1) from the screen to an optional fold mirror (3). The fold mirror is a flat reflector positioned at an angle such that light from the target source (1), located at about the center of the LCD (6), is reflected off the surface of the fold mirror (3), and directed to the physical center of the reflective surface (14) of the tilted elliptical surface of revolution mirror (5). The diverging beam of light passes through the beamsplitter (4) and strikes the reflective surface (14) of the curved reflector (5). The curved mirror is tilted to an off-axis condition. In a preferred embodiment, the optical axis (12) of the curved mirror (5) is tilted between 12 and 18 degrees toward the back of the display, offset from the target axis (11) or imaging beam. An imaginary line from the optical center to the surface of the curved mirror (14) defines the optical axis (12) of the curved mirror (5). In the system shown in FIG. 4, the diverging light-beam from the target source (1) strikes the surface of the curved mirror and reflects a converging light beam (26) at a complimentary angle in relation to the optical axis (12) of the curved mirror (5). The converging light beam (26) reflects off of the beamsplitter (4) at a complimentary angle to the surface of the beamsplitter (4), and the reflected beam (15) is directed to the viewing aperture (8), which, in this example, includes an optional neutral density filter glass. The light passes through the neutral density window and comes to focus at the focal point of the system (2), forming a real image in free space. The system shown in FIG. 1 also has an optional larger background LCD or monitor (7) positioned behind the beamsplitter (4), so that the background LCD screen (7) is visible as a background scene, when viewed through the window (8).

Figure 5:
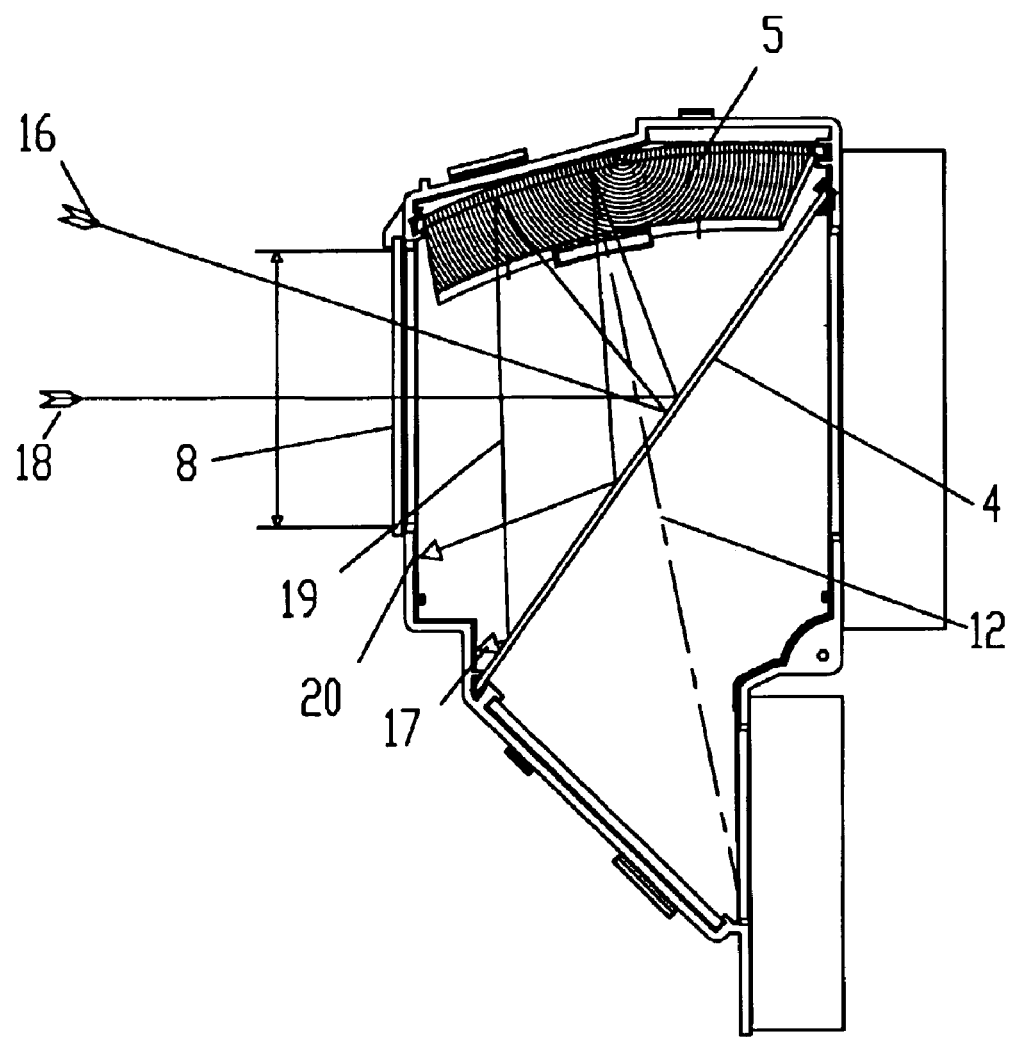
FIG. 5 shows how ghost imaging of light from outside the system configuration #2 of the present invention is blocked from exiting, and therefore is not visible to the viewer.

FIG. 5 shows the ghost imaging of stray light of the system described in FIG. 4. Light from an external source (18) outside the display system enters through the neutral density window, striking the beamsplitter (4), reflecting to the surface of the tilted elliptical curved mirror (5). The light is reflected (19) from the curved mirror at a complimentary angle to the axis (12) of the curved mirror, and then reflects again (17) off the surface of the beamsplitter (4). Because the curved mirror (5) is tilted off-axis, the light beam reflecting (17) off the beamsplitter (4) is directed below the window aperture (8), and does not exit the system; therefore, no ghost image is visible to the viewer.

Figure 6:
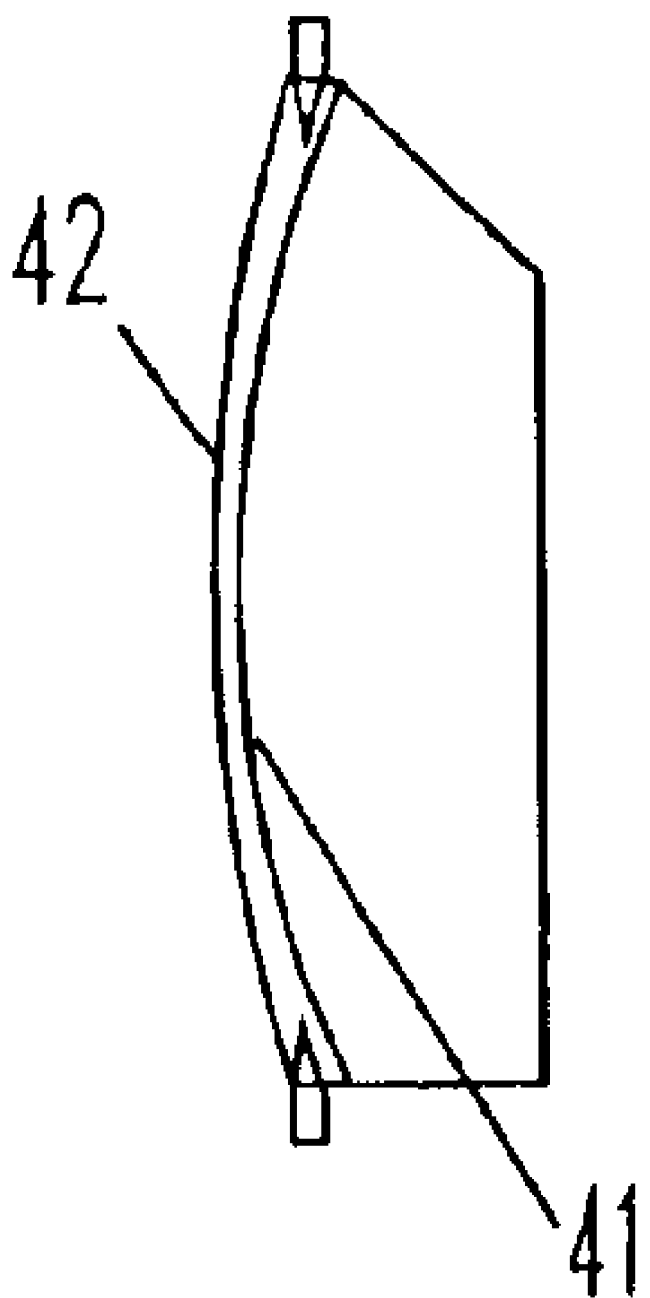
FIG. 6 shows the two surfaces of revolution of the curved mirror of the third configuration of the present invention.
Figure 7:
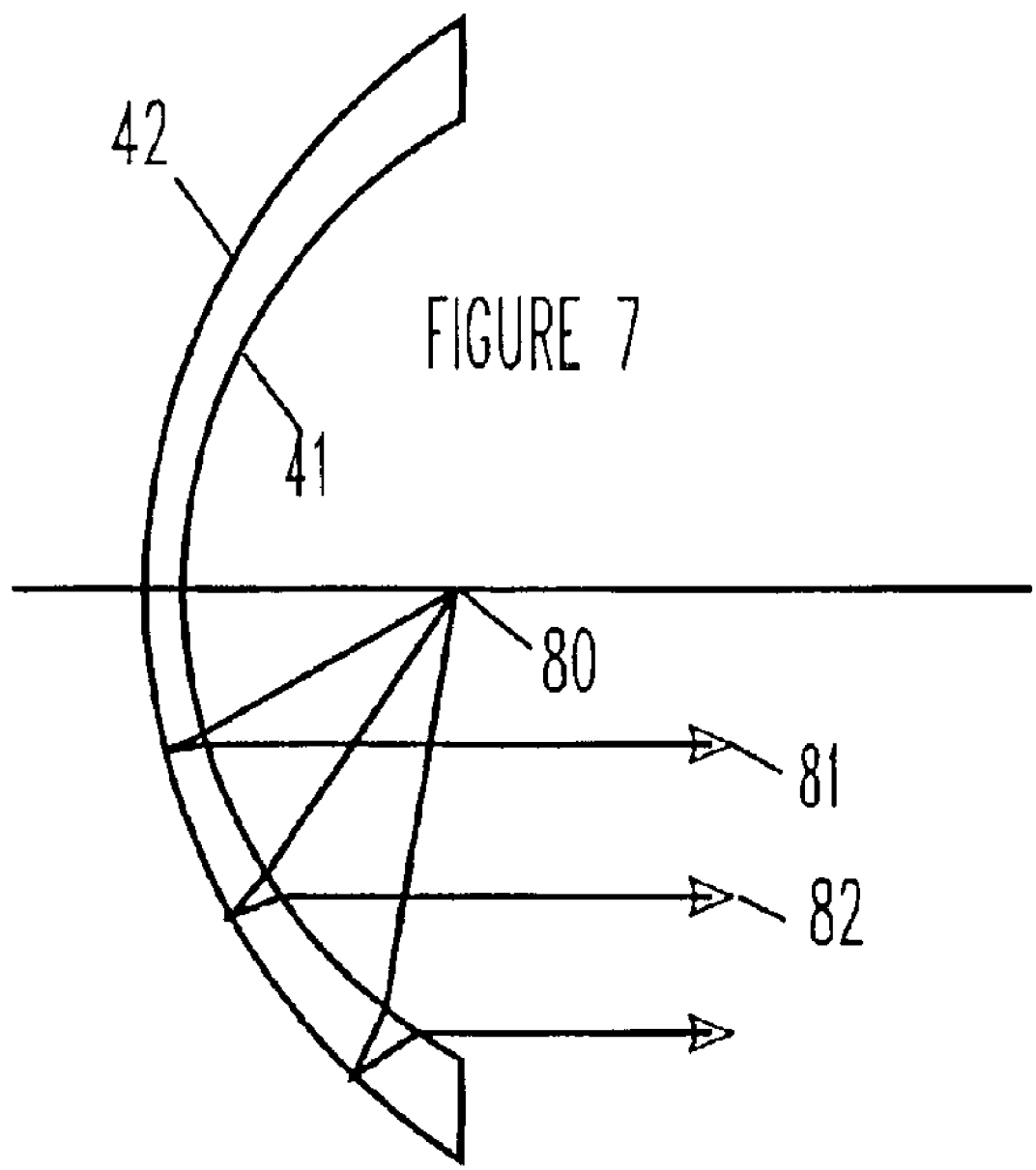
FIG. 7 shows the principles of the Mangin lens.
Figure 8:
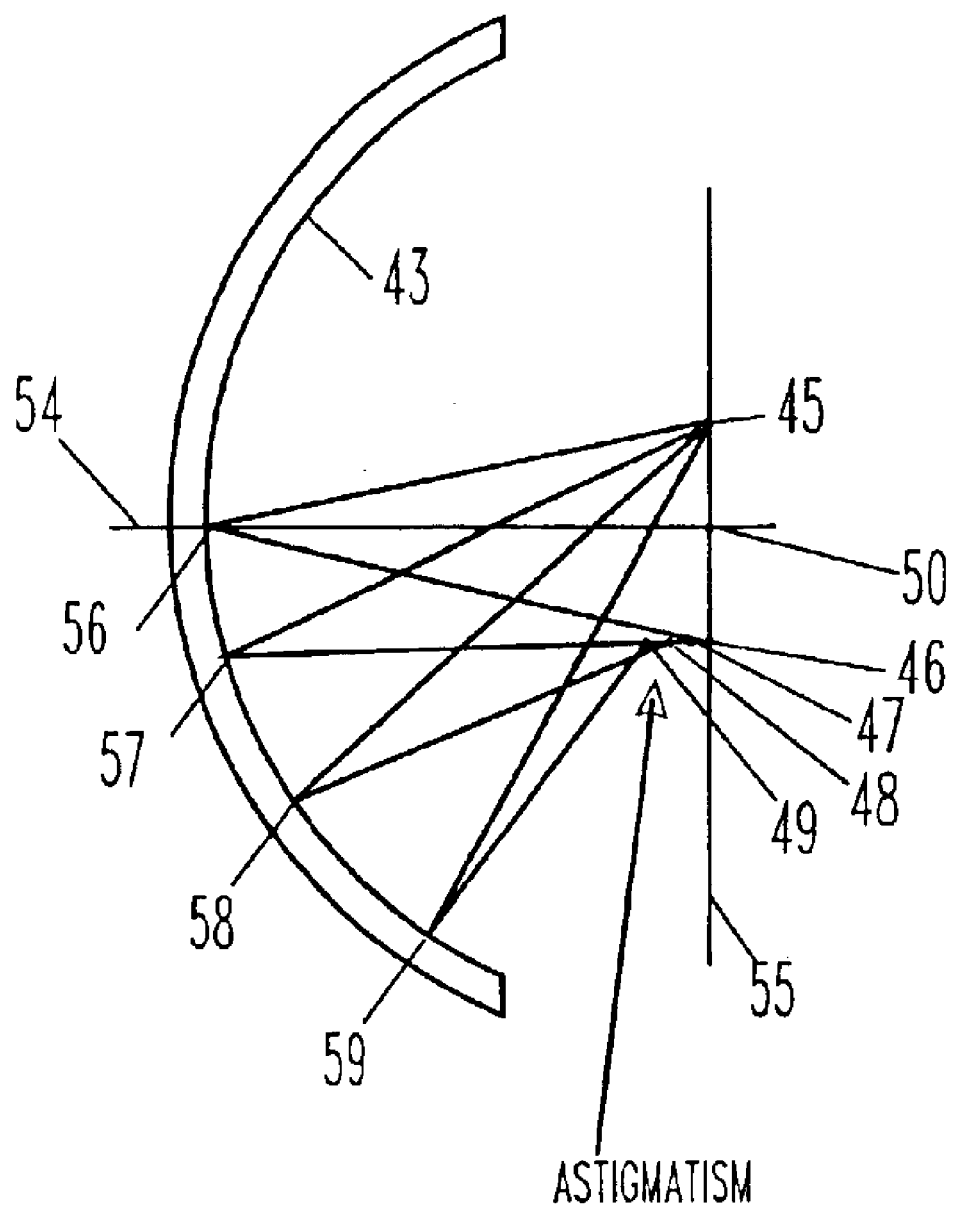
FIG. 8 shows the effects of astigmatism on a normal concave spherical surface of revolution.

FIGS. 6, 7 and 8 show how the two surfaces of revolution (41,42) can correct the aberrations of an optical system. In FIG. 7, a standard Mangin mirror is depicted. The Mangin mirror has two different spherical surfaces of revolution, having a convex spherical curve of longer radius (42) than the concave spherical curve (41). The concave surface (41) acts as a corrective lens, refracting the light rays to form a collimated beam (81,82) from a light source at the focal point of the system (80). The example shown uses two spherical curves to replicate a function of a single parabolic surface of revolution.

In FIG. 8, a single spherical surface of revolution mirror is depicted with the curve and reflective coating on the concave surface (43). Light emanating from a point (45) offset from the center of curvature (2× focal length) (50) is reflected off the spherical surface (56), and comes to focus at a point (46). Light striking other points on the spherical surface (57,58,59) comes to focus at slightly different points in space (47,48,49). This is a natural phenomenon of a spherical imaging system called astigmatism. Astigmatism can cause significant eyestrain when viewing a system for an extended period of time.

Figure 9:
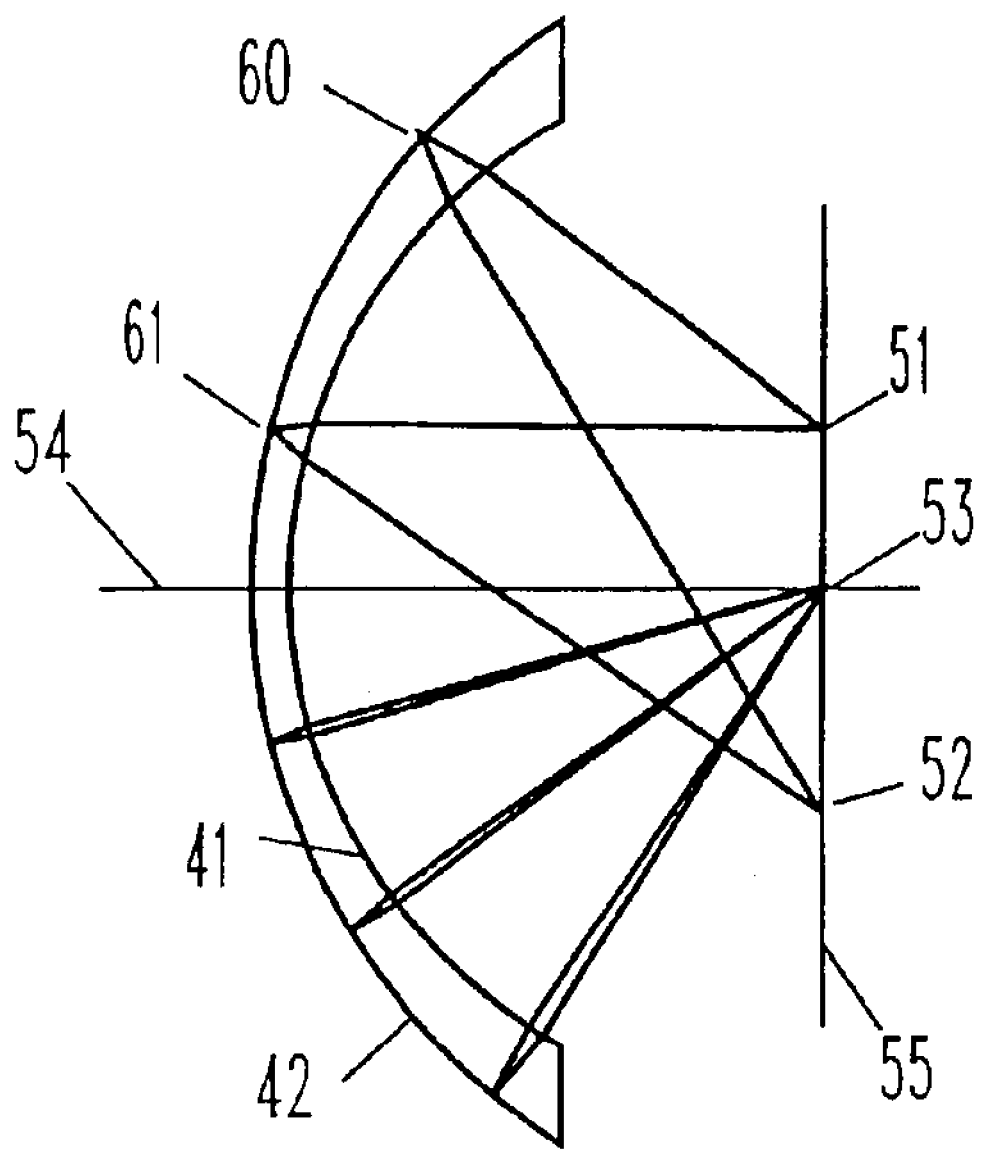
FIG. 9 shows how a Mangin lens can correct astigmatism.

Since a small real image projection system normally is viewed up close, astigmatism is a significant problem. One method of correcting for astigmatism is to incorporate a corrective lens in the optical path to redirect the reflected rays to a common focus point. The present invention uses a variation of the Mangin mirror concept to correct for the aberrations and astigmatism. Just as the Mangin mirror in FIG. 7 is able to refract the light waves into a collimated beam, the dual surface mirror of the present invention, as described herein, is able to refract light passing through the mirror substrate, and correct the astigmatism of the system. Unlike the Mangin mirror, two spheres would not be effective, however, as shown in FIG. 9, an aspheric surface of revolution on the concave surface (41) can be designed to refract the reflected light rays (60,61) to a common focal point (52). In most cases, the corrections can be incorporated into one aspheric surface of revolution on the concave surface (41), so that a standard spherical surface of revolution can be used for the convex reflective surface (42). In a system such as, for example, a video game application, where the real images typically are viewed for relatively long periods of time, it may be necessary to incorporate aspheric surfaces of revolution on both the convex (42) and concave (41) surfaces. This may be necessary in order to create a real image with minimal aberrations, which is necessary for extended periods of viewing without eyestrain.

Figure 10:
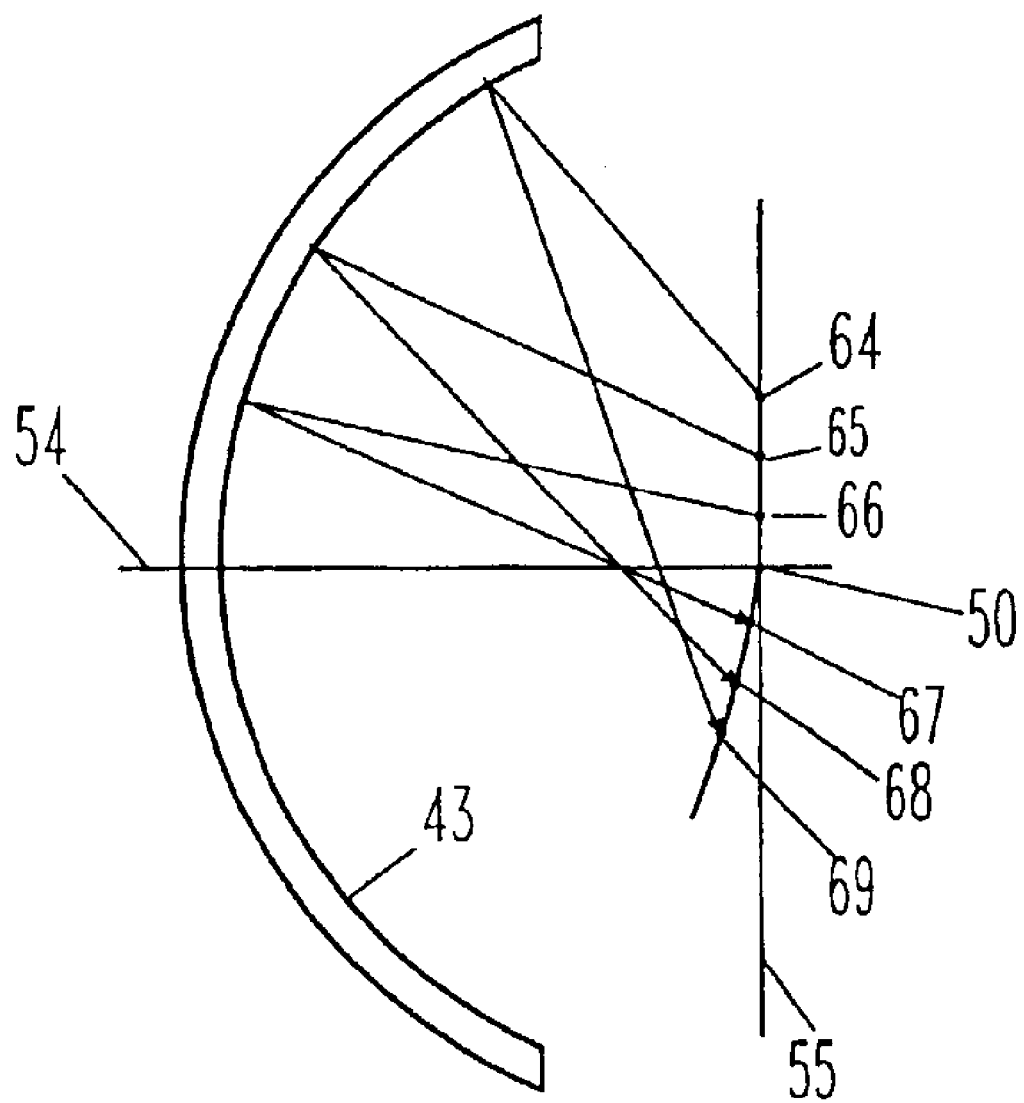
FIG. 10 shows the effects of spherical aberrations and field curvature distortion, when imaging at a point other than the center of the mirror's radius.

FIG. 10 shows the effects of field curvature distortion on a real image. This is a natural phenomenon of spherical optics and visual display systems, and there is no practical way to correct for this, without using an array of corrective lenses. In a commercial real image display system, this is neither practical nor cost effective. When imaging a point (64,65,66) offset from the curved mirror's optical axis (50), the focal points, or points of real image formation (67,68, 69), are not on a straight line or on a plane (55) with the image source points (44,45,46). The effects of field curvature distortion are that the object being imaged is slightly curved, and magnified near the center of the image. The center of the real image projects farther out from the device than the edges of the image (69).

Figure 11:
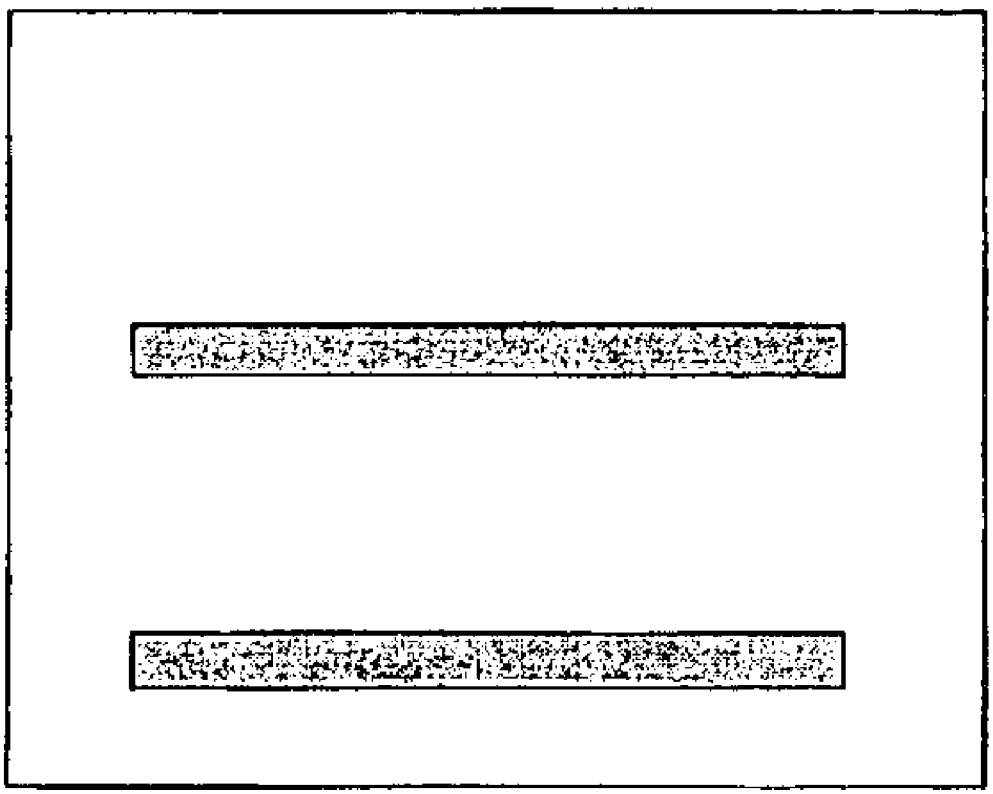
FIG. 11 shows an example of an image on a normal monitor.
Figure 12:
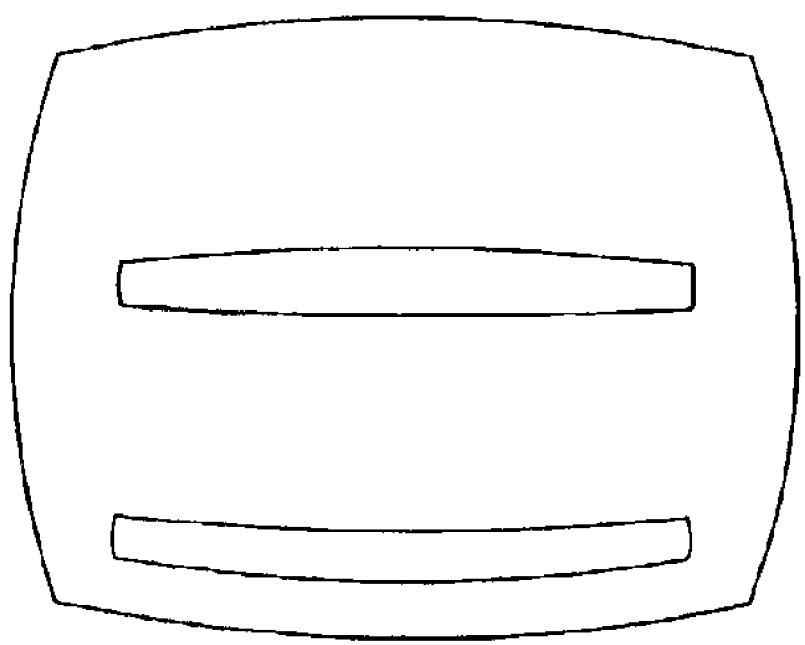
FIG. 12 shows an example of the effect of field curvature distortion on the image created from the target monitor depicted in FIG. 11.

In FIGS. 11 and 12, the effects of field curvature distortion are depicted; FIG. 11 shows a normal CRT screen image displaying two rectangles. FIG. 12 shows the resulting real image created by the system, and the effects of field curvature distortion on the real image; the rectangles are slightly curved, and are magnified in the area near the center of the screen.

Figure 13:
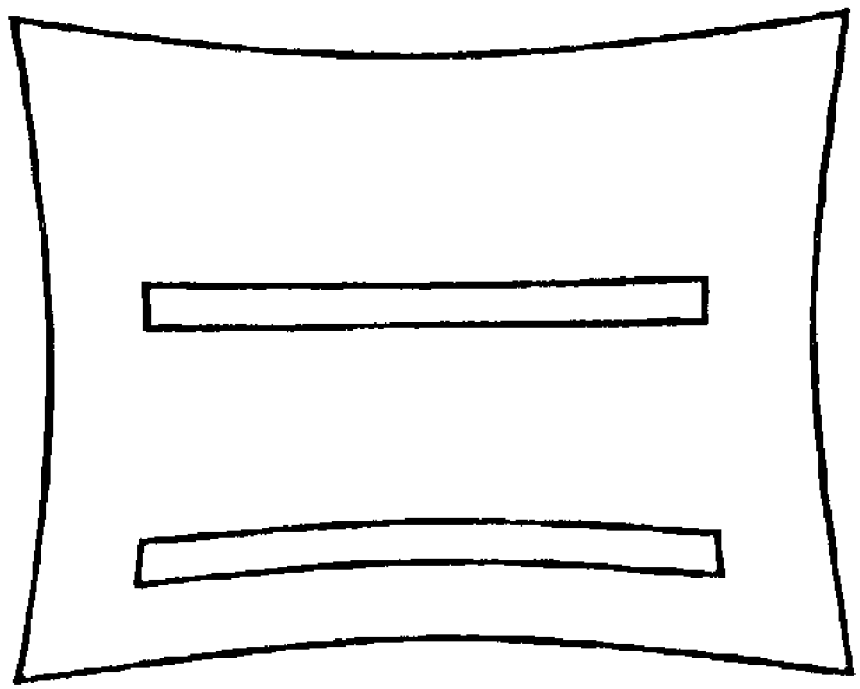
FIG. 13 and FIG. 14 show how a pin-cushioned scene on the monitor or target counteracts the effects of field curvature distortion.
Figure 14:
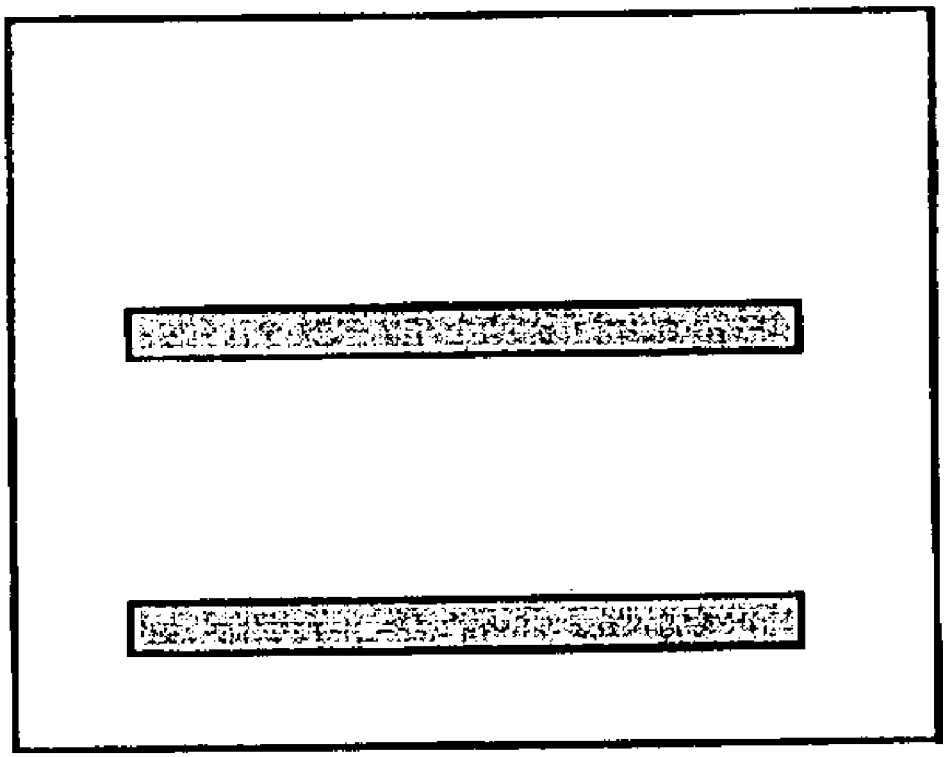

Creating a condition called "pin-cushion" on the CRT screen can compensate for the effects of the field curvature distortion. This can be done electronically, or by distorting the image using software. In a spherical mirror system, the distortion is reasonably symmetrical and round, because of the spherical surface of revolution. The CRT can be adjusted to create a "pin-cushion" image, as shown in FIG. 13. The resulting image, shown in FIG. 14, is a result of correction through field curvature distortion, thus compensating for the distortion.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A real image projection system, comprising:
   a) a curved mirror, mounted with an optical axis of said curved mirror at a tilted angle, relative to an imagine axis of said image projection system;
   b) a target object positioned below said curved mirror, facing toward a front of said image projection system, wherein said target object is selected from the group consisting of a real object, a monitor, a graphic image, a video image, and any object that reflects, transmits, or emits light;
   c) a flat fold mirror or reflector positioned below a viewing window of said image projection system, wherein a reflective surface of said flat fold mirror or reflector faces toward said curved mirror and toward said target object, said flat fold mirror or reflector being positioned at an angle such that a target beampath is reflected at a complimentary angle from said target object to said fold mirror to said curved mirror, striking a center or vertex of said curved mirror at an angle equal to twice the angle of tilt of said curved mirror relative to said imaging axis; and
   d) a neutral density window or circular polarizer window positioned along said imaging axis of said system, wherein said neutral density filter comprises a neutral density material or a neutral density coating, and wherein light transmitting through said filter is partially absorbed in near equal amounts across the visible light spectrum;
   further comprising a primary target beampath or target axis, which represents an imaginary line between a target object to the center of said flat fold mirror or reflector, reflecting off of said fold mirror or reflector at a complimentary angle to an optical center or vertex of a reflective surface of said curved mirror.

2. The real image projection system of claim 1, further comprising an imaging beampath that reflects along a viewing axis of said system, or at a complimentary angle to a target beampath relative to said tilt of said curved mirror, transmitting through a clear reflective substrate, through a window aperture and then forming a real image in space.

3. The real image projection system of claim 1, wherein said curved mirror's optical axis is tilted at an angle between 12 degrees and 18 degrees in relationship to an imaging or viewing axis of said system and relative to a target axis as reflected from said fold mirror.

4. The real image projection system of claim 3, wherein said curved mirror comprises:
   a) a curved mirror having a spherical surface of revolution; or
   b) a curved mirror having an elliptical surface of evolution, of a configuration whereby said ellipse represents a circle viewed at an angle of incidence equal to said tilt of said curved mirror, thereby reducing distortions at edges of said curved mirror, or
   c) a curved mirror having an aspheric surface of revolution for reducing optical aberrations of said system.

5. The real image projection system of claim 1, wherein a real image is positioned along a viewing axis of said system at a focal point of said system, or at a distance equal to twice a focal length of said curved mirror, if said curved mirror is a parabola, or at a distance equal to a radius of a curved sphere, assuming a 1× magnification, and wherein a target object is located at a distance from said curved mirror equal to a radius of said curved mirror.

6. The real image projection system of claim 5, wherein a position of said target object is other than at a center point of radius for creating a magnified or de-magnified real image.

7. The real image projection system of claim 1, further comprising a background object or monitor or projection screen that is viewed reflected off of a beamsplitter, forming a virtual image located behind a real image, along a viewing axis of said system, and wherein said background object is anything that emits, transmits or reflects light.

8. The real image projection system of claim 1, comprising a curved mirror that has two different surfaces of revolution, one of said two different surfaces of revolution being on a concave surface of said mirror, and another of said two different surfaces of revolution being on a convex surface of said mirror, wherein said real image projection system forms a real image floating in space.

9. The real image projection system of claim 8, comprising an aspheric surface of revolution on said concave surface, and a standard conic or asphere surface of revolution on said convex surface, wherein said convex surface is optically coated with a reflective material.

10. The real image projection system of claim 8, comprising a standard conic or aspheric surface of revolution on said concave surface, and an aspheric surface of revolution on said convex surface, wherein said convex surface is optically coated with a reflective material.

11. The real image projection system of claim 8, further comprising an anti-reflective coating on said concave surface of revolution.

12. The real image projection system of claim 8, comprising a distorted input screen image with pin-cushioning effect, wherein said screen image is distorted in a configuration whereby distortion caused by field curvature distortion is counteracted, thereby causing a video image to distort in a maimer opposite of fisheys effect, thereby producing a true scaled, undistorted real image of an object represented.

13. The real image projection system of claim 1, comprising a distorted input screen image with pin-cushioning effect, wherein said screen image is distorted in a configuration whereby distortion caused by field curvature distortion is counteracted, thereby causing a video image to distort in a manner opposite of fisheye effect, thereby producing a true scaled, undistorted real image of an object presented.

14. A real image projection system, comprising:
   a) a curved mirror of elliptical or aspheric surface of revolution, mounted with an optical axis of said mirror at a tilted angle of between 12 and 18 degrees, relative to a target axis of said imaging system from between a target object and a center of said curved mirror, positioned overhead with a front edge of said curved mirror nearest a window aperture positioned lower than a rear edge of said curved mirror;
   b) a beamsplitter positioned at a 45 degree angle to an axis of said curved mirror and at an angle equal to 45 degrees plus said tilt angle of said curved mirror relative to said target axis of said imaging system, mounted with a top of said beamsplitter positioned nearest a rear edge of said curved mirror, and a bottom edge of said beamsplitter positioned directly beneath said window viewing aperture;
   c) a target object positioned at a point along an optical target axis of said imaging system or along an axis offset by said angle of tilt of said curved minor, with said target axis vertical from said target to a center of said curved mirror, wherein said target object is selected from the group consisting of a real object, a monitor, a graphic image, a video image, and any object that reflects, transmits, or emits light;
   d) a window positioned between said beamsplitter and a real image formed by said system, wherein said window is selected from the group consisting of a neutral density substrate, a circular polarizer, or tinted glass; and
   e) a real image formed outside said system along said imaging axis.

15. The real image projection system of claim 14, further comprising:
   f) a fold mirror or flat reflector positioned along a beampath axis between said target object and said curved mirror, which redirects the beampath, allowing said target object to be repositioned at a point other than along said target axis.

16. The real image projection system of claim 15, further comprising a primary target beampath or target axis, which represents an imaginary line between said target object to a center of said fold mirror, reflecting off of said fold mirror at a complimentary angle to an optical center or vertex of a reflective surface of said curved mirror, striking said curved minor at an angle equal to said tilt of said curved mirror.

17. The real image projection system of claim 14, further comprising an anti-reflective surface applied to one or both surfaces of said window.

18. The real image projection system of claim 14 wherein said curved mirror comprises an elliptical surface of revolution, of which said elliptical curve is an equivalent curvature of a circle viewed at an angle equal to said tilt angle of said curved mirror, so that a lightbeam striking said curved elliptical surface at an offset angle strikes a relative spherical curve.

19. The real image projection system of claim 14, wherein said curved mirror comprises an aspheric surface of revolution, which approximates an elliptical curve and further reduces aberrations of image quality.

20. The real image projection system of claim 14, further comprising an imaging beampath that reflects along said viewing axis or at a complimentary angle to said target beampath, relative to said tilt axis of said curved mirror, away from said viewing aperture, striking a surface of said beamsplitter, reflecting off said beamsplitter surface at a complimentary angle, and transmitting through a window aperture on a horizontal axis plane, and then forming a real image in space.

21. The real image projection system of claim 14, comprising a real image positioned along a viewing axis of said system at a focal point of said system, or at a distance equal to twice a focal length of said curved mirror, if said mirror is a parabola, or at a distance equal to a radius of a curved sphere, assuming a 1× magnification, and wherein said target object is located at a distance from said mirror equal to a radius of said mirror.

22. The real image projection system of claim 14, wherein a position of said target object is other than at a center point of radius for creating a magnified or de-magnified real image.

23. The real image projection system of claim 14, further comprising a background object that is viewed through said beamsplitter, along a viewing axis of said system, wherein said background object is anything that emits, transmits or reflects light.

24. The real image projection system of claim 14, comprising a distorted input screen image with pin-cushioning effect, wherein said screen image is distorted in a configuration whereby distortion caused by field curvature distortion is counteracted, thereby causing a video image to distort in a manner opposite of fisheye effect, thereby producing a true scaled, undistorted real image of an object represented.

* * * * *